United States Patent [19]
Albrecht et al.

[11] Patent Number: 5,369,198
[45] Date of Patent: Nov. 29, 1994

[54] COPOLYMERS BASED ON MALEIC ACID DERIVATIVES AND VINYL MONOMERS, THEIR PRODUCTION AND APPLICATION

[75] Inventors: Gerhard Albrecht, Leonding; Hubert Leitner, Haus/Ennstal; Rudolf Lindenberger, Steyr; Richard Siedl, Asten; Christian Werenka, Ansfelden, all of Austria; Willi Suter, Burgdorf, Switzerland

[73] Assignees: Chemie Linz Gesellschaft m.b.H, Austria; Holderchem Holding AG, Switzerland

[21] Appl. No.: 189,642

[22] Filed: Feb. 1, 1994

[30] Foreign Application Priority Data

Feb. 1, 1993 [AT] Austria ............... A 162/93

[51] Int. Cl.$^5$ ............................. C08F 30/04
[52] U.S. Cl. .................. 526/240; 526/304; 526/262
[58] Field of Search .............. 526/240, 262, 304

[56] References Cited

U.S. PATENT DOCUMENTS

| | | |
|---|---|---|
| 3,544,344 | 12/1970 | Pratt et al. . |
| 3,563,930 | 2/1971 | Stram et al. . |
| 3,923,717 | 12/1975 | Lalk et al. . |
| 4,478,727 | 10/1984 | Turner et al. ............ 252/8.5 C |
| 4,725,665 | 2/1988 | Pieh et al. ............ 528/247 |
| 4,972,025 | 11/1990 | Tsubakimoto et al. ...... 525/329.4 |
| 5,100,984 | 3/1992 | Büge et al. ............ 526/240 |
| 5,162,060 | 11/1992 | Bredow et al. . |

FOREIGN PATENT DOCUMENTS

| | | |
|---|---|---|
| 0171189 | 2/1986 | European Pat. Off. . |
| 0188905 | 7/1986 | European Pat. Off. ....... 526/262 |
| 0373621 | 12/1990 | European Pat. Off. . |
| 1004055 | 12/1961 | United Kingdom . |
| 1555521 | 11/1979 | United Kingdom . |
| 2221673 | 2/1990 | United Kingdom . |
| 2255096 | 10/1992 | United Kingdom . |

OTHER PUBLICATIONS

JP 63-297255 A., Patent Abstracts of Japan, C-581, Apr. 4, 1989, vol. 13, No. 134.

Journal of Polymer Science: Polymer Chemistry Edition vol. 22, 2281-2285 (1984).

*Primary Examiner*—Joseph L. Schofer
*Assistant Examiner*—N. Sarofim
*Attorney, Agent, or Firm*—Wenderoth, Lind & Ponack

[57] ABSTRACT

Copolymers which are composed essentially of the structural elements

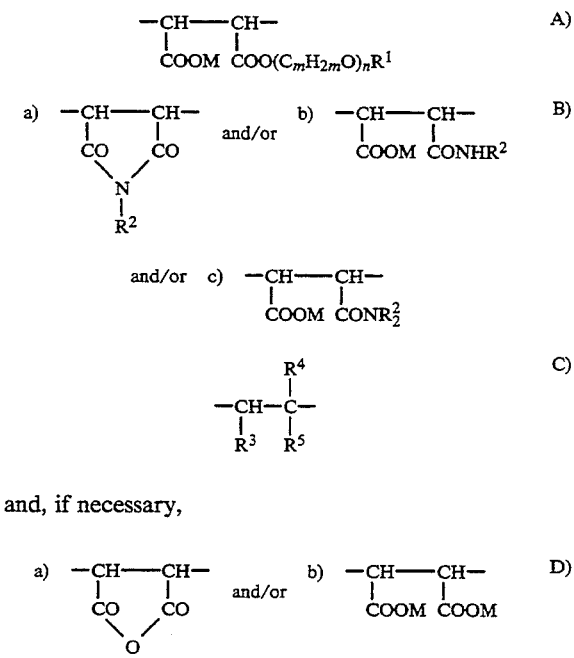

and, if necessary, The copolymers can be employed as dispersing agents for inorganic or organic substances, especially as a plasticiser for hydraulic binders.

3 Claims, No Drawings

COPOLYMERS BASED ON MALEIC ACID DERIVATIVES AND VINYL MONOMERS, THEIR PRODUCTION AND APPLICATION

The invention relates to copolymers based on maleic acid derivatives and vinyl monomers, their production and application, as well as binder mixtures and building materials containing copolymers.

Copolymers based on maleic anhydride are known, for example, from the DE-A-33 44 470 and the U.S. Pat. No. 4,972,025 and are employed, among other things, as additives for hydraulic binders e.g. cement, anhydrite or plaster, in which they increase flowability in particular during processing or improve the mechanical qualities of the hardened building material. Additives based on naphthalenesulphonic acid-formaldehyde condensates possess especially good flow properties, as described in the U.S. Pat. No. 4,725,665. These additives, designated as liquefiers, plasticisers, superplasticisers, dispersing agents, or water reducing agents, possess the disadvantage, however, that the binder's flowability cannot be maintained for a sufficiently long period of time. Since concrete is increasingly delivered to the construction site as pre-mixed or ready-mixed concrete, this loss of workability. (slump loss) within a short period of time represents a problem which-must be solved urgently.

Superplasticisers based on maleic acid derivatives (from the U.S. Pat. No. 5,100,984 and DE-A-41 42 388) or those based on melamine and glyoxylic acid (from the DE-A-42 17 181) which already allow for a certain amount of control over the flow properties of cement mixtures are known. However, the qualities of these cement mixtures are not sufficient for the actual increased demands. Also, the production of the starting materials employed is in-part costly.

Consequently, the task remains of finding improved additives in the area of binder liquefiers and dispersing agents for solid matter suspensions which yield an optimum combination of qualities, especially with regard to their flow and setting properties, and also with regard to the maintenance of their effectiveness in the event of relatively long periods of storage in the form of their aqueous preparations as well, i.e. especially those which are effective at dispersing and liquefying in binder suspensions in particular and which enable optimum and practical control over the time frame of processing without at the same time excessively delaying the setting process.

It was found that new copolymers with a special composition based on maleic acid, maleic esters, maleic amides, or maleic imide derivatives and vinyl polymers do not possess these disadvantages and yield the desired, positive qualities as additives to binders.

The object of the invention is therefore copolymers which are composed essentially of the structural elements

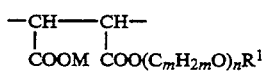

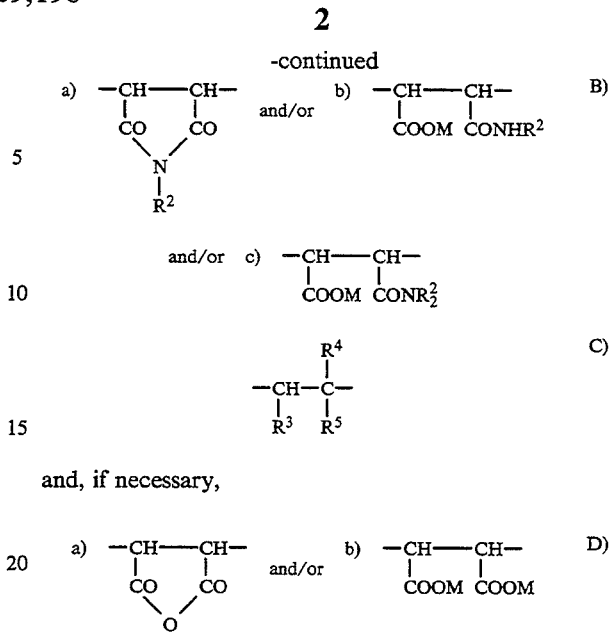

whereby
M: represents H or a cation such as alkaline or alkaline-earth metal, an ammonium group, or the residue of an organic amino group,
$R^1$: represents $C_1$ to $C_{20}$ alkyl, $C_5$ to $C_8$ cycloalkyl or aryl group residue,
$R_2$: represents H, $C_1$ to $C_{20}$ alkyl or hydroxyalkyl, $C_5$ to $C_8$ cycloalkyl or aryl group residue in which 1 or more H atoms can be substituted by the structural elements $—COOM$, $—SO_3M$ and/or $PO_3M_2$, as well as structural units of the General Formula $(C_mH_{2m}O)_n R^1$, which can repeat if necessary,
$R^3$: represents H, a methyl or methylene group which can be substituted if necessary and which forms a 5 to 8-member ring or an indene ring which $R^5$ includes,
$R^4$: represents H, a methyl or ethyl group,
$R^5$: represents H, $C_1$-$C_{20}$ alkyl, $C_5$-$C_8$ cycloalkyl or aryl group residue, which can be substituted if necessary, an alkoxy carbonyl group, an alkoxy group, an alkyl or aryl carboxylate group, a carboxylate group, a hydroxyalkoxy carbonyl group,
m: represents a whole number from 2 to 4,
n: represents a whole number from 0-100, preferably from 1-20.

Mono- di- or trialkyl- or -alkanolamines with 1 to 8 C atoms are possible, for example, as residue M from organic amino groups.

The structural elements A, Ba, Bb, Bc, C and D respectively can represent uniform compositions; however, they can also be present as mixtures of various compositions. The mean molecular weight of the copolymers as claimed in the invention amounts to approximately 1000 to 100,000, preferably approximately 2000 to 50,000 g/mole.

Preferably, the structural elements A amount to approximately 1 to 85, more preferably 20 to 55 mole % in the copolymers as claimed in the invention; preferably; the structural elements B amount to approximately 1 to 85, more preferably 2 to 25 mole %; preferably, the structural elements C amount to approximately 1 to 90, more preferably 40 to 60 mole %, and preferably, the structural elements D amount to 0 to 50, more preferably 1 to 10 mole %. A composition of 35 to 40 mole % of the structural elements A, 5 to 10 mole % of the structural elements B, 50 mole % of the structural elements C and 2 to 5 mole % of the structural elements D have proven to be especially favorable. In the copolymers as claimed in the invention, 1:1 would be an especially advantageous molar ratio of the structural units (A+B+D):C.

The starting products which make up the structural elements C and D in the copolymer are employed in the form of the corresponding monomers G and H as claimed in the invention.

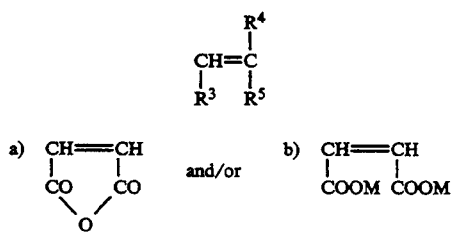

On the other hand, the structural elements A and B can be employed either in the form of the preformed units E or F,

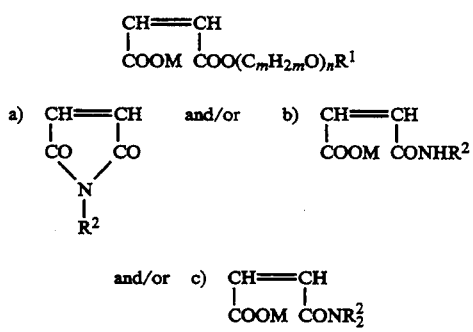

or they are formed during or after polymerization by means of a polymer analogous reaction. Structural element A is composed of monoesterified dicarboxylic acid structures, whereby M preferably represents hydrogen or sodium; m preferably represents 2; n preferably represents 5 to 20, and $R^1$ preferably represents a linear or branched alkyl group with 1 to 3 carbon atoms. More preferably, monoesterified maleic anhydride units with monomethoxypolyethylene glycol or monomethoxypolyethylene-block-propylene glycol with a mean molecular weight of 250 g/mole (n=5) to 750 g/mole (n=17).

The anhydride units remaining in the copolymer are represented by structural element D, which can, as claimed in the invention, be present either as anhydride ring Da) or in hydrolyzed form Db), whereby M preferably represents hydrogen or sodium.

Structural unit B is present according to Formula Ba) as a 5-member, preferably N-substituted imide ring which can already be given by the structure of the monomers employed for the production of the copolymers, or which can be produced by means of the method as claimed in the invention through the conversion of compounds which carry primary amino groups with the anhydride group of the maleic anhydride. In this case, $R^2$ is preferably a linear or branched $C_4$ to $C_{12}$ alkyl group, a cyclohexyl ring, a phenyl or naphthyl group, substituted if necessary, or a linear or branched, terminally closed polyoxyalkylene glycol of the General Formula $(C_mH_{2m}O)_nR^1$ with m=2–4, n=0–100 and $R^1=C_1$–$C_{20}$ alkyl, $C_5$–$C_8$ cycloalkyl or aryl. $R^2$ residues which carry hydrophile groups, preferably sulphonic acid groups, are especially preferable. The following are examples of the preformed monomers which supply structural element B: N-phenylmaleimide, N-(2,6-dimethylphenyl)maleimide, N-hydroxyethylmaleimide, N-(4-sulphophenyl)maleimide. The following are examples of compounds which form structural element C in the course of the method as claimed in the invention through a reaction with the anhydride units: cyclohexylamine, 2-ethylhexylamine, n-laurylamine, glutamic acid, glycine, morpholine, sulphanilic acid, taurine, naphthylaminesulphonic acid, naphthylaminedisulphonic acid, aminoethanephosphonic acid and phosphanilic acid. Structural unit B can also be present in the form of a corresponding semi-amide according to the formulas Bb and Bc.

The G monomers which produce structural element C are preferably compounds which possess a strong tendency to copolymerizate with maleic anhydrides. Examples of such monomers are: ethylene, propylene, n-butene, 2-methylpropene, diiso-2-methylpropene, cyclohexene, styrene, alpha-methylstyrene, indene, 4-methoxystyrene, 4-methylstyrene, vinyl acetate, vinyl propionate, methylvinylether, ethylvinylether, isobutylvinylether, tetrahydrophthalic anhydride, n-butyl acrylate, methyl methacrylate, hydroxymethyl methacrylate or methacrylic acid.

These monomers or structural elements can, if necessary, also be employed in mixtures with one another or with other monomers.

A further-object of the invention is a method for the production of copolymers characterized by the structural units A to D which dispenses with the otherwise common organic solvents, whereby a high yield of the copolymers are produced with a method which is easy to use. For the production of the copolymers, a) one starts with a maleic acid semi-ester according to Formula E) or a mixture of a polyalkylene glycol monoether and maleic anhydride, which also reacts to the maleic acid semi-ester according to Formula E at approximately 100° to 140° C. When an esterification catalyst is employed, or a mixture of maleic acid semi-ester, polyalkylene glycol monoether and maleic anhydride, b) the monomer components according to Formula F or their starting substances, G and, if necessary, H, as well as more polyalkylene glycol monoether if necessary, as well as common polymerization aids if necessary are added at approximately 40° to 120° C. while being agitated, c) agitation of the mixture is continued at 40° to 150° C. in order to complete the polymerization reaction and the polymer analogous conversion, and d) after cooling to approximately 50° to 80° C., the reaction mixture is normally neutralized with a base and diluted to the desired concentration with water.

As claimed in the invention, either the polyalkylene glycol monoether required for the composition of the partial structure A, or the macromet maleic acid semi-ester obtained in a previous reaction of maleic anhydride and the polyalkylene glycol monoether, or a mixture of both, may be employed as a reaction medium. Preferably, the semi-ester is obtained at 120°–140° C. over a period of 2 to 4 hours, and preferably 0.5 to 1.0 weight % of an esterifying catalyst such as sulphuric acid or toluene-p-sulphonic acid is employed. As claimed in the invention, a linear or branched alkoxypolyalkylene glycol amine required for the composition of the partial structure B or a mixture of polyalkylene glycol monoether and polyalkylene glycol amine monoether may be used as a reaction medium.

The bonding of structural elements A to D is preferably performed in such a way that one starts with a portion or all of the polyalkylene glycol monoether, which is mixed with a portion or all of the maleic anhydride. After completion of the previous reaction under the conditions described above, performed if necessary, the polymerization initiator is set and copolymerization is performed by adding the monomers which form structural units C, which can contain the polymerization initiator in a dissolved form if necessary. This inflow of monomers, however, can also contain the monomers which supply structural units B in the event that they are not miscible with one another. This method can, however, also be performed with 2 separate monomer inflows, preferably when the polymer analogous formation of structural element B is impossible due to the insolubility of the amino compound in the polymer, such as when sulphanilic acid is employed.

Common additives such as those known to polymerization technology experts can be used as polymerization aids. Preferably, these are polymerization initiators such as azobisisobutyronitrile, azobis-2-methylvaleronotrile, dibenzoyl peroxide, lauroyl peroxide, dicyclohexylperoxodicarbonate, tertiary butyl peroxy-2-ethylhexanoate and tertiary butyl perbenzoate, as well as polymerization accelerators or activators such as sodium bisulphite, ascorbic acid or salts from heavy metals, or molecular weight-controllers such as dodecanethiol, tertiary dodecanethiol or diisopropylxanthogen disulphite.

Preferably, the polymerization reactions are performed at temperatures of approximately 40° to 120°, more preferably at 60° to 100° C. The temperatures for the subsequent reaction for completing the formation of esters, semi-amides, and/or imides are preferably 100° to 150° C.

In an especially preferred method of producing copolymers according to the invention, a) one starts with a mixture of a polyalkylene glycol monoether of formula $HO(C_mH_{2m}O)_nR^1$ and a molar deficit of maleic anhydride, b) a mixture of a solution of an amine of formula $NH_2R^2$ or $NHR^2_2$ in polyalkylene glycol monoether to which maleic anhydride is added while being agitated, a monomer component according to Formula G, if necessary by doses from a separate inflow container,

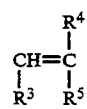

G)

whereby M, $R^1$, $R^2$, $R^3$, $R^4$, $R^5$, m and n have the meanings as described in claim 1, as well as more polyalkylene glycol monoether if necessary, as well as common polymerization aids if necessary, are added at approximately 40° to 120° C. while being agitated, c) the mixture is agitated further at 40° to 150° C. to complete the polymerization reaction and the polymer analogous conversion, and d) the reaction mixture is normally neutralized with a base after cooling to approximately 50° to 80° C. and diluted to the desired concentration with water.

When doing so, one starts with a partial amount of the polyalkylene glycol monoether required for the formation of structural element A together with a deficit of maleic anhydride. The monomer containing amino groups which is required for the composition of structural unit B, preferably N-(4-sulphophenyl)maleic acid monoamide, is formed while being agitated in an agitable inflow container by dissolving 4-sulphanilic acid, which is preferably a salt, in the remaining amount of polyglycol and subsequently adding maleic anhydride. The amount of initiator required for polymerization is also subsequently dissolved in this mixture. After the reactor receiver has been brought to polymerization temperature, the addition of the mixture is begun. At the same time, the addition of the monomers or monomer mixture required for the formation of structural element C from a separate inflow container is begun, and polymerization is conducted. After completion of polymerization, the polymer analogous esterification and formation of amides or imides is completed at a higher temperature.

During polymerization, a viscous reaction mass is formed which is easily agitable and which is normally diluted with water after cooling to 50°-80° C. and neutralized by adding a base, e.g. an alkaline substance.

The method as claimed in the invention is characterized above all in that the yield is high, the residual monomer proportion in the final product is low, and that it is simple, environmentally friendly, and safe.

All starting materials employed are components of the final product, which is therefore free of undesirable solvent residues. At first, the polyalkylene glycol monoether serves as a reaction medium for the formation of certain monomers such as sulphophenyl maleic acid monoamide; later, it serves as a polymerization medium and has a positive effect on heat dissipation and agitability of the polymer. Finally, it is incorporated into the copolymer itself as a component via the free OH group. In contrast to known methods in which the production of carboxylic acid imide structures with substituents which carry sulphonic acid groups in polymers analogously to polymerization can be done only in an aqueous solution and under pressure and remains incomplete, the reaction is successful without pressure and produced a high yield with the aid of the method as claimed in the invention.

The copolymers as claimed in the invention are suitable as additives to aqueous suspensions of powdery substances such as clays, porcelain slips, silica flour, chalk, carbon black, crushed rocks, pigments, talcum and plastic powders, though they are especially suitable for suspensions of hydraulic binders such as portland cement, portland blast-furnace cement, trass cement, fly-ash cement, aluminous cement, magnesia cement, anhydrite or plaster in which they serve primarily as dispersing agents. Furthermore, the application or use of the copolymers as additives to hydraulic binders such as portland cement, portland blast-furnace cement, trass cement, fly-ash cement, anhydrite or plaster is preferable. The copolymers as claimed in the invention can also be added to the hydraulic binders as a grinding aid for improving the grinding qualities, which means that the grinding process can be planned more efficiently.

The copolymers as claimed in the invention can be directly added to the cement mixtures such as cement masses, mortar or concrete in the form of their aqueous solutions or in anhydrous form in the amount of approximately 0.01 to 10%, preferably 0.05 to 3% solid matter in relation to the weight of the cement. Compared to the known additives, they demonstrate considerably increased dispersion, improved flow and setting qualities; they are free of formaldehyde and can maintain the flowability of the binder mixtures for a relatively long period of time. This means that the duration of processability of the binder mixtures can be increased with the aid of the copolymers as claimed in the invention due to the reduced slump loss. At the same time, however, the setting process of the finished building material is delayed only slightly. A further decisive advantage of the polymers according to the invention is that they do not lose their high initial dispersing power even after being stored for a relatively long period of time in the form of their aqueous preparations.

A further object of the invention are binder mixtures which contain hydraulic binders and the copolymers as claimed in the invention as well as water, common aggregates and additives, if necessary. A further object of the invention is a building material based on these binder mixtures.

A) PRODUCTION EXAMPLES

EXAMPLE 1

In a reaction container with a thermometer, agitator, gasentry tube, reflux condenser and 2 connections for separate inflows, one starts with 282 g of methoxypolyethylene glycol (Hoechst company) with a mean molecular weight (M) of 500 g/mole (0.564 mole) and mixes them with 6.1 g of maleic anhydride (0.062 mole) while agitating. The trapped air is replaced by nitrogen, and the contents of the flask are heated to 95° C.

At the same time, in a separate agitable inflow container (inflow 1) containing nitrogen, a solution of 282 g of methoxypolyethylene glycol (M=500 g/mole, 0.564 mole) and 43.5 g of 4-sulphanilic acid-sodium salt dihydrate (0.188 mole) is prepared, into which 122.8 g of maleic anhydride (1.253 mole) were introduced while agitating. When this was done, N-(4-sulphophenyl)-maleic acid monoamide with an intense yellow coloration was obtained immediately, for which 15 mole % of the maleic anhydride employed was required. Subsequently, 5.5 g of azobisisobutyronitrile (0.0335 mole) were added while being agitated, and this mixture was agitated until a completely clear solution was obtained. After the reaction temperature of 95° C. was reached in the polymerization container, the monomer solution which was prepared in the inflow container 1 and 137.1 g of styrene (1.318 mole) were added to the reactor from a second inflow container (inflow 2) by dose, continuously and simultaneously, over a period of 2 hours. After the addition process was complete, the mixture was agitated for another 2 hours at 95° C., heated to 140° C. and agitated for a further 2 hours to complete esterification and the formation of imides.

The clear, orange-colored polymer melt was cooled to 50° C. while being agitated and diluted by adding 130 g of distilled water. Subsequently, a pH value of 6.95 and a solid matter content of 36 weight % was achieved by adding 174 g of an aqueous 20% sodium hydroxide solution and 180 g of distilled water. A clear, yellowish-orange solution with a proportion of 0.39 weight % free styrene and a content of 0.17 weight % maleic acid (determined by means of HPLC).

The mean molecular weight, determined by means of gel chromatography and using polyacrylic acid as a standard, amounted to 22,000 g/mole.

EXAMPLE 2

The process was similar to Example 1 with the difference that the inflows contained the following components:

| Inflow 1: | 282.0 g | methoxypolyethylene glycol (M = 500 g/mole, 0.564 mole) |
| --- | --- | --- |
| | 110.0 g | maleic anhydride (1.122 mole) |
| | 3.1 g | dodecanethiol |
| | 5.5 g | azobisisobutyronitrile (0.0335 mole) |
| Inflow 2: | 125.5 g | styrene (1.207 mole) |
| | 22.7 g | N-phenylmaleimide (0.131 mole) |

After dilution and neutralization of the reddish-brown polymer melt, a clear, yellowish solution with a solid matter content of 33.9 weight %, 0.06 weight % non-converted styrene, 0.02 weight % free maleic acid and a mean molecular weight of the copolymer of 11,000 g/mole was obtained.

EXAMPLE 3

Conversion as described in example 1 and 2 was repeated except that, instead of N-phenylmaleimide (Example 2), 26.3 g (0.131 mole) of N-(2,6-dimethylphenyl)maleimide, dissolved in 125.5 g of styrene, was employed. The final product, a clear, yellow aqueous solution, contained 34.4 weight % solid matter, 0.41 weight % free styrene and 0.17 weight % free maleic acid. The mean molecular weight amounted to 9,000 g/mole.

EXAMPLE 4

Example 1 was repeated with the difference, however, that the N(4-sulphophenyl)maleic acid monoamide in inflow container 1 was employed as a preformed monomer in the form of a mononatrium salt in the amount of 35.7 g (0.122 mole). A clear, yellowish-orange copolymer solution with a solid matter content of 36.0 weight %, 0.2 weight % styrene, 0.07 weight % maleic acid and a mean molecular weight of 16,000 g/mole was obtained.

EXAMPLE 5

Copolymerization was repeated analogously to Example 1 with the following amounts and compositions of the inflows:

| Inflow 1: | 282.0 g | methoxypolyethylene glycol (M = 500 g/mole, 0.564 mole) |
| --- | --- | --- |
| | 122.8 g | maleic anhydride (1.253 mole) |
| | 33.1 g | 5-amino-2-naphthalenesulphonic acid-sodium salt (0.125 mole) |
| | 5.5 g | azobisisobutyronitrile (0.0335 mole) |
| Inflow 2: | 137.1 g | styrene (1.318 mole) |

The clear, deep brown polymer solution with a solid matter content of 35.9 weight % contained 0.22 weight % free styrene and 0.10 weight % free maleic acid at a mean molecular weight of 17,500 g/mole.

EXAMPLE 6

Instead of 5-amino-2-naphthalenesulphonic acid-sodium salt as in Example5, 43.6 g of 1-amino-3,6-naphthalenesulphonic acid-sodium salt (0.125 mole) was employed. The clear, blackish-brown polymer solution contained 35.5 weight % solid matter 0.37 weight % styrene and 0.21 weight % maleic acid and had a mean molecular weight of 19,500 g/mole.

EXAMPLE 7

First, 600 g of methoxypolyethylene glycol (M=500, 1.20 mole) were added to the same reaction container as described in Example 1 except with only one inflow connection, and 147 g of maleic anhydride (1.50 mole) were dissolved while being agitated. The trapped air was removed by rinsing with nitrogen, and the contents of the flask were heated to 95° C. Subsequently, 156 g of styrene (1.50 mole) which contained 6.45 g of dissolved azobisisobutyronitrile (0.0393 mole) were added from an inflow container by uniform doses over a period of 2 hours, and the temperature was then held constant at 95° C. for a further 2 hours. Subsequently, a mixture of 11.1 g of butan-n-ol (0.15 mole) and 14.9 g of cyclohexylamine (0.15 mole) was added to the agitated reaction mass within 10 minutes, and the temperature was raised to 140° C. After this temperature was reached, agitation was continued for another 2 hours at 140° C. to complete the formation of the esters and imides (analogous to polymerization), whereby a clear, deep orange polymer was obtained which was diluted with 1000 g of distilled water after cooling to 50° C., adjusted to a pH value of 7.01 with 180 g of a 20% sodium hydroxide solution at room temperature, and subsequently brought to a solid matter content of 36.1 weight % by adding a further 450 g of water. The content of unconverted styrene was 0.58 weight %; the free maleic acid content was 0.16 weight %. The copolymer had a mean molecular weight of 23,000 g/mole.

EXAMPLE 8

According to the method described in Example 7, except that instead of cyclohexylamine, 19.4 g (0.15 mole) of 2-ethylhexylamine were employed, and an aqueous copolymer solution with a solid matter content of 35.7 weight %, 0.22 weight % styrene, 0.22 weight % maleic acid and M=23,500 g/mole was obtained.

EXAMPLE 9

The method was analogous to Example 7, though with the following changes:

| | | |
|---|---|---|
| Receiver: | 500.0 g | of methoxypolyethylene glycol (1.00 mole) |
| | 147.0 g | of maleic anhydride (1.50 mole) Before polymerization, the contents of the receiver were agitated for 1 hour at 130° C. until partial esterification had taken place. |
| Inflow: | 156.0 g | styrene (1.50 mole) |
| | 6.45 g | azobisisobutyronitrile (0.0393 mole) |
| | 3.6 g | dodecanethiol |

After Polymerization, imidization was performed by adding 24.5 g of cyclohexylamine (0.25 mole) and conducting a 2-hour conversion at 140° C. The aqueous solution of the neutralized copolymer with a molecular weight of 2,500 g/mole was deep red and contained 37.0 weight % solid matter, 0.31 weight % free styrene and 0.03 weight % free maleic acid.

EXAMPLE 10

Example 9 was repeated with the difference that 32.3 g of 2-ethylhexylamine (0.25 mole) was employed instead of cyclohexamine. After processing, the copolymer with a mean molecular weight of 3,000 g/mole was present in the form of its sodium salt in an aqueous solution with a solid matter content of 38.0 weight % and residual monomer proportions of 0.28 weight % styrene and 0.05 weight % maleic acid.

EXAMPLE 11

Example 7 was repeated but with the following changes:

| | | |
|---|---|---|
| Receiver: | 522 g | methoxypolyethylene glycol (1.105 mole) |
| | 167 g | maleic anhydride (1.700 mole) |
| Inflow: | 221 g | styrene (2.125 mole) |
| | 11.6 g | dodecanethiol |
| | 9.7 g | azobisisobutyronitrile |
| | 1.9 g | azobiscyclohexanecarbonitrile |

Polymerization was performed at 105° C. with an inflow time of 60 minutes. After a subsequent reaction of 2 hours at 115° C., 56.5 g of di-2-methoxyethylamine (0.425 mole) were added over a period of 15 minutes and agitated for 2 h at 140° C. to complete the ester and semi-amide formation. The crude product obtained was neutralized by adding water and Ca(OH)$_2$.

EXAMPLE 12

The method was analogous to Example 11, although 28.3 g of di-2-methoxyethylamine were employed.

EXAMPLE 13

Example 7 was repeated, but with the following changes:

| | | |
|---|---|---|
| Receiver: | 600 g | methoxypolyethylene-block-propylene glycol with a mean EO value of 10 and 3 PO units (0.958 mole) |
| | 125 g | maleic anhydride (1.278 mole) |
| Inflow: | 160 g | styrene (1.534 mole) |
| | 8.6 g | dodecanethiol |
| | 7.1 g | azobisisobutyronitrile |
| | 1.4 g | azobiscyclohexanecarbonitrile |

Polymerization was performed at 105° C. The inflow time amounted to 1 hour. After a subsequent reaction of 2 hours at 115° C., 17.0 g of di-2-methoxyethylamine (0.128 mole) were added and agitated for another 2 hours at 140° C. A 40% solution of the polymer was obtained by adding water and calcium hydroxide.

EXAMPLE 14

Example 7 was repeated, but with the following changes:

| | | |
|---|---|---|
| Receiver: | 455 g | methoxypolyethylene glycol (0.910 mole) |
| | 137 g | maleic anhydride (1.400 mole) |
| Inflow: | 182 g | styrene (1.75 mole) |
| | 9.6 g | dodecanethiol |
| | 8.0 g | azobisisobutyronitrile |

| | 1.6 g | azobiscyclohexanecarbonitrile |
|---|---|---|

Polymerization was performed at 105° C. (inflow time: 1 hour). After a subsequent reaction of 120 minutes, 250 g of methoxypolyethylene glycol-block-propylene glycol amine with a mean EO value of 13 and a mean PO value of 3 units per mole were added over a period of 30 minutes. Afterwards, the reaction mixture was heated to 140° C. and agitated at 140° C. for 2 hours. Subsequently, the copolymer was cooled to 100° C., diluted with water and neutralized with calcium hydroxide.

CONTROL EXAMPLE V1

Commercial naphthalenesulphonic acids formaldehyde polycondensate ("LIQUIMENT N" from Chemie Linz Ges.m.b.H.)

CONTROL EXAMPLE V2

Commercial melaminesulphonic acid-formaldehyde polycondensate ("LIQUIMENT MP-K" from Chemic Linz Ges.m.b.H.)

CONTROL EXAMPLE V3

According to the method described in the EP-A-402 563 (Production Example 7), a copolymer was obtained from methoxypolyethylene glycol monomaleate and N-vinyl pyrrolidone.

CONTROL EXAMPLE V4

According to the method described in the EP-A-41 42 388 (Production Example 1), a copolymer was obtained from methoxypolyethylene glycol monomaleate and styrene.

B) APPLICATION EXAMPLES

The copolymers from examples 1 to 14 were subjected to comparative testing as a plasticiser for cement mixtures in order to demonstrate their increased and longer lasting effectiveness in comparison to known plasticisers.

According to DIN 1164/7, 450 g of portland cement produced by the Holderbank AG company, Rekingen, was mixed in a mixer according to the norms with 1350 g of standard sand (proportion of coarse:fine sand=2:1) and 225 g of water which contained the copolymer as claimed in the invention in dissolved form. At a constant water/cement proportion of 0.50, the addition by doses of the products as claimed in the invention and the control products was done in such a way that the consistency of the mixtures remained comparable. Immediately after production of the mortar, the slump and its temporal change were determined over a period of 90 minutes. In addition, the setting behavior of the mortar mixtures with identical consistencies was determined.

The results of this comparative testing are abstracted in Table 1

TABLE 1

Flow and setting behavior of mortar mixtures with copolymers as claimed in the invention and control mixtures.

| Additive acc. to Ex. | Dose % solid matt. rel. to cement | Extent of slump in mm after | | | | | | | Setting Beginn. h:m | End h:m |
|---|---|---|---|---|---|---|---|---|---|---|
| | | 0 m | 15 m | 30 m | 45 m | 60 m | 75 m | 90 m | | |
| 1 | 0.17 | 202 | 185 | 176 | 171 | 164 | 159 | 152 | 8:00 | 9:30 |
| 2 | 0.20 | 203 | 186 | 178 | 170 | 163 | 158 | 150 | 7:55 | 9:20 |
| 3 | 0.20 | 196 | 190 | 178 | 169 | 162 | 154 | 148 | 7:30 | 9:00 |
| 4 | 0.20 | 208 | 191 | 179 | 172 | 167 | 160 | 154 | 8:00 | 9:25 |
| 5 | 0.20 | 190 | 180 | 175 | 170 | 163 | 157 | 151 | 7:15 | 8:45 |
| 6 | 0.30 | 196 | 191 | 187 | 179 | 175 | 170 | 164 | 7:20 | 8:45 |
| 7 | 0.16 | 202 | 188 | 182 | 172 | 166 | 160 | 150 | 7:50 | 9:20 |
| 8 | 0.17 | 203 | 183 | 174 | 170 | 164 | 160 | 148 | 7:50 | 9:20 |
| 9 | 0.20 | 208 | 195 | 187 | 176 | 170 | 166 | 159 | 8:00 | 9:20 |
| 10 | 0.20 | 195 | 185 | 177 | 169 | 164 | 160 | 156 | 7:25 | 9:00 |
| 11 | 0.175 | 196 | 183 | 178 | 171 | 168 | 162 | 157 | 7:35 | 9:05 |
| 12 | 0.175 | 202 | 192 | 186 | 181 | 171 | 167 | 164 | 8:20 | 9:50 |
| 13 | 0.175 | 202 | 188 | 175 | 171 | 162 | 156 | 148 | 7:00 | 8:30 |
| 14 | 0.20 | 206 | 198 | 191 | 184 | 180 | 174 | 168 | 8:30 | 10:00 |
| V1 | 0.40 | 191 | 174 | 160 | 150 | | | | 5:20 | 6:40 |
| V2 | 0.40 | 190 | 168 | 146 | | | | | 5:30 | 7:00 |
| V3 | 0.40 | 205 | 201 | 197 | 191 | 186 | 184 | 178 | 13:10 | 14:40 |

In order to describe the behavior of the products as claimed in the invention in their aqueous preparations during storage in comparison to conventional plasticisers for cement, some products were stored at a constant temperature of 60° C. over a period of 7 days and examined at certain intervals with regard to their effectiveness as a plasticiser for cement.

In Table 2, the extents of slump according to DIN 1164/7 after various storage periods are abstracted:

TABLE 2

Dispersing behavior of polymers as claimed in the invention and controls as a function of the period of storage of the aqueous preparations at 60° C.:

| Additive acc. to Example | Dose % of solid matter rel. to cement | Slump in mm after | | |
|---|---|---|---|---|
| | | 0 days | 2 days | 7 days |
| 1 | 0.20 | 222 | 215 | 220 |
| 2 | 0.25 | 221 | 223 | 218 |
| 6 | 0.40 | 237 | 230 | 229 |
| 9 | 0.25 | 215 | 220 | 223 |
| 11 | 0.25 | 225 | 229 | 221 |
| 12 | 0.20 | 223 | 213 | 226 |
| 13 | 0.25 | 235 | 239 | 233 |
| 14 | 0.20 | 206 | 212 | 206 |
| V4 | 0.20 | 227 | 220 | 197 |

What we claim is:

1. Copolymers which are composed essentially of the structural elements

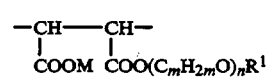

B)
a) 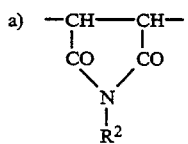 and/or  b) —CH——CH—
                                    |     |
                                    COOM  CONHR² and/or c) —CH——CH—
           |     |
           COOM  CONR²₂

C)
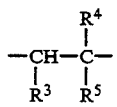

and, optionally,

D)
a) 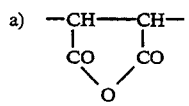 and/or  b) —CH——CH—
                                    |     |
                                    COOM  COOM whereby M: represents H or a cation such as alkaline or alkaline-earth metal, an ammonium group, or the residue of an organic amino group, $R^1$: represents $C_1$ to $C_{20}$ alkyl, $C_5$ to $C_8$ cycloalkyl or aryl group residue, $R^2$: represents H, $C_1$ to $C_{20}$ alkyl or hydroxyalkyl, $C_5$ to $C_8$ cycloalkyl or aryl group residue in which 1 or more H atoms can be substituted by the structural elements —COOM, —SO₃M and/or PO₃M₂, as well as structural units of the General Formula $(C_mH_{2m}O)_nR^1$, which optionally can be repeated, $R^3$: represents H, a methyl or a methylene group which can be substituted if necessary and which forms a 5 to 8-member ring or an indene ring which includes $R^5$, $R^4$: represents H, a methyl or ethyl group, $R^5$: represents H, $C^1$-$C^{20}$ alkyl, $C_5$-$C^8$ cycloalkyl or aryl group residue, an alkoxy carbonyl group, an alkoxy group, an alkyl or aryl carboxylate group, a carboxylate group, a hydroxyalkoxy carbonyl group, m: represents a whole number from 2 to 4, n: represents a whole number from 0–100, preferably from 1–20.

2. Copolymers as claimed in claim 1 characterized in that they are composed of 1 to 85 mole % structural element A,
1 to 85 mole % structural element B,
1 to 90 mole % structural element C,
0 to 50 mole % structural element D.

3. Copolymers as claimed in claim 1 characterized in that they are composed of 20 to 55 mole % structural element A,
2 to 25 mole % structural element B,
40 to 60 mole % structural element C,
1 to 10 mole % structural element D.

* * * * *